(12) United States Patent
Kawahara et al.

(10) Patent No.: US 8,004,239 B2
(45) Date of Patent: *Aug. 23, 2011

(54) BATTERY MANAGEMENT SYSTEM FOR CALCULATING CHARGE AND DISHARGE POWERS

(75) Inventors: Youhei Kawahara, Hitachi (JP); Akihiko Emori, Hitachi (JP); Shuko Yamauchi, Hitachi (JP); Hirotaka Takahashi, Hitachinaka (JP); Masami Shida, Mito (JP); Yoshinori Aoshima, Tsukubamirai (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/400,323

(22) Filed: Mar. 9, 2009

(65) Prior Publication Data

US 2009/0174369 A1    Jul. 9, 2009

Related U.S. Application Data

(63) Continuation of application No. 11/638,528, filed on Dec. 14, 2006, now Pat. No. 7,514,905.

(30) Foreign Application Priority Data

Dec. 16, 2005   (JP) ................................ 2005-362733

(51) Int. Cl.
*H01M 10/48* (2006.01)
(52) U.S. Cl. ....................................................... 320/128
(58) Field of Classification Search .................. 320/107, 320/116, 118, 134, 137, 150, 157, 162, 128, 320/149
See application file for complete search history.

(56) References Cited

U.S. PATENT DOCUMENTS

| 4,392,101 | A  | * | 7/1983 | Saar et al. ..................... 320/156 |
| 5,523,667 | A  | * | 6/1996 | Feldstein ...................... 320/118 |
| 7,514,905 | B2 | * | 4/2009 | Kawahara et al. ............ 320/150 |

FOREIGN PATENT DOCUMENTS

| JP | 2003-219510 A |   | 7/2003 |
| JP | 2003219510 A  | * | 7/2003 |

* cited by examiner

*Primary Examiner* — Edward Tso
(74) *Attorney, Agent, or Firm* — Crowell & Moring LLP (57) ABSTRACT

A battery management system which can output a battery state enabling optimum charge and discharge control to be performed even when a temperature variation occurs among individual single cells. A plurality of temperature sensors measure temperature values of a battery. A measurement unit measures a voltage and a current of the battery. A maximum/minimum temperature selection unit in a calculation unit determines a maximum temperature and a minimum temperature from the temperature values measured by the temperature sensors. An available power calculation unit calculates respective values of maximum available charge and discharge powers or maximum available charge and discharge currents of the battery corresponding to the maximum temperature and the minimum temperature based on the voltage and the current of the battery. A selection unit selects and outputs smaller maximum available charge and discharge powers or smaller maximum available charge and discharge currents from the respective values of the maximum available charge and discharge powers or the maximum available charge and discharge currents of the battery corresponding to the maximum temperature and the minimum temperature, which are calculated by the calculation unit.

5 Claims, 8 Drawing Sheets

BATTERY MANAGEMENT SYSTEM FOR CALCULATING CHARGE AND DISHARGE POWERS

This application is a continuation of U.S. patent application Ser. No. 11/638,528, filed Dec. 14, 2006, the entire disclosure of which is incorporated herein by reference, which in turn claims priority under 35 U.S.C. §119 of prior Japanese application no. 2005-362733, filed Dec. 16, 2005.

BACKGROUND OF THE INVENTION

1. Field of the Invention

The present invention relates to a battery management system for managing the state of a battery, e.g., a lead-acid battery, a nickel-hydrogen battery, or a lithium-ion battery.

2. Description of the Related Art

A battery, e.g., a lead-acid battery, a nickel-hydrogen battery, or a lithium-ion battery, is mounted in a vehicle. The battery supplies electric power required, for example, to start an engine, operate electrical equipment, and to run a hybrid or electric vehicle.

The battery mounted in a vehicle is used over a wide temperature range and has a maximum available power corresponding to each value of temperature. If the battery is charged or discharged beyond the maximum available power, overcharge or overdischarge may occur. Generally, the battery in a lower temperature state has a smaller maximum available power, and the battery in a higher temperature state has a larger maximum available power. Also, although the battery in a higher temperature state has a larger maximum available power, using the battery in the higher temperature state accelerates deterioration of the battery. Looking at the state of charge SOC, the higher the SOC of the battery, the smaller is a maximum available charge power and the larger is a maximum available discharge power. Also, the lower the SOC of the battery, the smaller is the maximum available discharge power and the larger is the maximum available charge power. In order to stably and optimally use the battery, charge and discharge control has to be performed within the range not exceeding the maximum available power regardless of any states of the battery including, for example, states ranging from low temperature to high temperature and from low SOC to high SOC.

One known method for satisfying such a requirement is disclosed in, e.g., Patent Document 1 (JP-A-2003-219510). With the disclosed method, the battery charge and discharge control is performed by setting a charge power upper limit value and a discharge power upper limit value to be smaller than those at room temperature when the battery temperature is lower or higher than a predetermined temperature, whereby the charge power and the discharge power are held not to exceed the charge and discharge power upper limit values.

SUMMARY OF THE INVENTION

A battery used in a hybrid or electric vehicle is generally in the form of a combined battery including a plurality of single cells optionally combined with each other. In the combined battery, a temperature variation occurs among the plurality of single cells, and the individual single cells have different maximum available powers. Further, an SOC variation occurs among the plurality of single cells, and the individual single cells have different maximum available powers.

A first object of the present invention is to provide a battery management system which can output a battery state enabling optimum charge and discharge control to be performed even when a temperature variation occurs among individual single cells.

A second object of the present invention is to provide a battery management system which can output a battery state enabling optimum charge and discharge control to be performed even when a variation in the state of charge occurs among individual single cells.

(1) To achieve the above first object, the present invention provides a battery management system comprising a plurality of temperature measuring units for measuring temperature values of a battery capable of charging and discharging electricity; a voltage and current measuring unit for measuring a voltage and a current of the battery; a calculation unit for determining a maximum temperature and a minimum temperature of the battery from the temperature values measured by the temperature measuring units, and calculating respective values of maximum available charge and discharge powers or maximum available charge and discharge currents of the battery corresponding to the maximum temperature and the minimum temperature based on the voltage and the current of the battery measured by the voltage and current measuring unit; and a selection unit for selecting smaller maximum available charge and discharge powers or smaller maximum available charge and discharge currents from the respective values of the maximum available charge and discharge powers or the maximum available charge and discharge currents of the battery corresponding to the maximum temperature and the minimum temperature, which are calculated by the calculation unit.

With those features, even when a temperature variation occurs among individual single cells constituting the battery, the battery state can be outputted so that optimum charge and discharge control may be performed.

(2) In above (1), preferably, the battery management system further comprises a limiter unit for limiting the values of the maximum available charge and discharge powers or the maximum available charge and discharge currents, which are calculated by the calculation unit, to be reduced when the voltage of the battery measured by the voltage and current measuring unit is near an upper limit voltage or a lower limit voltage.

(3) To achieve the second object, the present invention provides a battery management system comprising a plurality of temperature measuring units for measuring temperature values of a battery capable of charging and discharging electricity; a voltage and current measuring unit for measuring a voltage and a current of the battery and voltages of a plurality of single cells constituting the battery; a calculation unit for determining a maximum voltage and a minimum voltage among the single cells in the battery from the voltage values of the single cells in the battery measured by the voltage and current measuring unit, and calculating respective values of maximum available charge and discharge powers or maximum available charge and discharge currents of the battery corresponding to the maximum voltage and the minimum voltage based on the voltage and the current of the battery measured by the voltage and current measuring unit; and a selection unit for selecting smaller maximum available charge and discharge powers or smaller maximum available charge and discharge currents from the respective values of the maximum available charge and discharge powers or the maximum available charge and discharge currents of the battery corresponding to the maximum voltage and the minimum voltage, which are calculated by the calculation unit.

With those features, even when a variation in the state of charge occurs among the individual single cells, the battery state can be outputted so that optimum charge and discharge control may be performed.

(4) In above (3), preferably, the battery management system further comprises a limiter unit for limiting the values of the maximum available charge and discharge powers or the maximum available charge and discharge currents, which are calculated by the calculation unit, to be reduced when the voltage of the battery measured by the voltage and current measuring unit is near an upper limit voltage or a lower limit voltage.

(5) To achieve the first and second objects, the present invention provides a battery management system comprising a plurality of temperature measuring units for measuring temperature values of a battery capable of charging and discharging electricity; a voltage and current measuring unit for measuring a voltage and a current of the battery and voltages of a plurality of single cells constituting the battery; a calculation unit for determining a maximum temperature and a minimum temperature of the battery from the temperature values measured by the temperature measuring units, calculating respective values of maximum available charge and discharge powers or maximum available charge and discharge currents of the battery corresponding to the maximum temperature and the minimum temperature based on the voltage and the current of the battery measured by the voltage and current measuring unit, determining a maximum voltage and a minimum voltage among the single cells in the battery from the voltage values of the single cells in the battery measured by the voltage and current measuring unit, and calculating respective values of maximum available charge and discharge powers or maximum available charge and discharge currents of the battery corresponding to the maximum voltage and the minimum voltage based on the voltage and the current of the battery measured by the voltage and current measuring unit; and a selection unit for selecting smallest maximum available charge and discharge powers or smallest maximum available charge and discharge currents from the respective values of the maximum available charge and discharge powers or the maximum available charge and discharge currents of the battery corresponding to the maximum temperature, the minimum temperature, the maximum voltage and the minimum voltage, which are calculated by the calculation unit.

With those features, even when a temperature variation and/or a variation in the state of charge occurs among the individual single cells, the battery state can be outputted so that optimum charge and discharge control may be performed.

(6) To achieve the first object, the present invention provides a battery management system comprising a plurality of temperature measuring units for measuring temperature values of a battery capable of charging and discharging electricity; a voltage and current measuring unit for measuring a voltage and a current of the battery; a calculation unit for determining a maximum temperature and a minimum temperature of the battery from the temperature values measured by the temperature measuring units, and calculating respective values of maximum available charge and discharge powers or maximum available charge and discharge currents of the battery corresponding to the maximum temperature and the minimum temperature based on the voltage and the current of the battery measured by the voltage and current measuring unit; a selection unit for selecting smaller maximum available charge and discharge powers or smaller maximum available charge and discharge currents from the respective values of the maximum available charge and discharge powers or the maximum available charge and discharge currents of the battery corresponding to the maximum temperature and the minimum temperature, which are calculated by the calculation unit; and a limiter unit for limiting the values of the maximum available charge and discharge powers or the maximum available charge and discharge currents, which are calculated by the calculation unit, to be reduced when the voltage of the battery measured by the voltage and current measuring unit is near an upper limit voltage or a lower limit voltage.

With those features, even when a temperature variation occurs among individual single cells constituting the battery, the battery state can be outputted so that optimum charge and discharge control may be performed.

According to the present invention, even when a temperature variation and/or a variation in the state of charge occurs among the individual single cells, optimum charge and discharge control can be realized.

DESCRIPTION OF THE PREFERRED EMBODIMENTS

The construction and operation of a battery management system according to a first embodiment of the present invention will be described below with reference to FIGS. 1 through 6.

Figure 1:
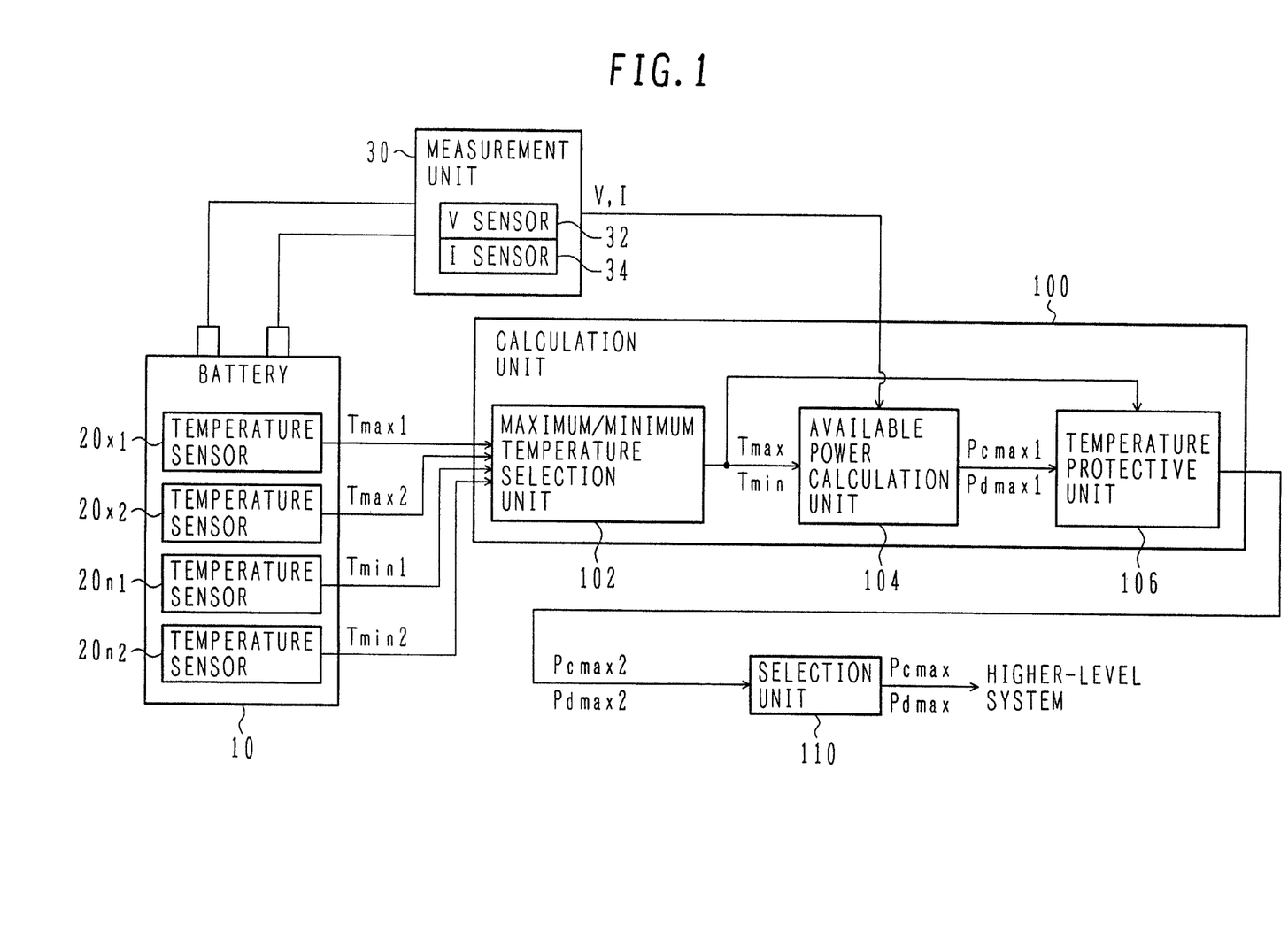
FIG. 1 is a block diagram showing the system configuration of a battery management system according to a first embodiment of the present invention.

The following description is first made of the system configuration of the battery management system according to the first embodiment of the present invention with reference to FIG. 1.

FIG. 1 is a block diagram showing the system configuration of the battery management system according to the first embodiment of the present invention.

A battery 10 is an electricity storage device capable of charging and discharging electricity, and it is, for example, a lead-acid battery, a nickel-hydrogen battery, a lithium-ion battery, or an electric double-layer capacity. The battery 10 is constituted by a plurality of single cells. In a hybrid or electric vehicle, the battery 10 is generally used by combining a plurality of single cells in series or in parallel, each cell constituting a nickel-hydrogen battery or a lithium-ion battery. For example, when 400 V is required as an output voltage of the battery 10, the predetermined output voltage can be obtained by connecting single cells in series in number sufficient to satisfy such a requirement. Additionally, the battery 10 is cooled by, e.g., air cooling.

The battery 10 includes a plurality of temperature sensors. FIG. 1 shows an example including four temperature sensors $20x1$, $20x2$, $20n1$ and $20n2$. The temperature sensors $20x1$, $20x2$, $20n1$ and $20n2$ are each made of a thermocouple or a thermistor. A maximum temperature area and a minimum temperature area of the battery 10 can be confirmed by performing a thermal analysis of the battery 10. The temperature sensors $20x1$ and $20x2$ are disposed near the maximum temperature area to detect a maximum temperature. The temperature sensors $20n1$ and $20n2$ are disposed near the minimum temperature area to detect a minimum temperature. Although the temperature sensor for detecting the maximum temperature and the temperature sensor for detecting the minimum temperature can be each detected by one sensor, reliability can be improved by arranging two or more temperature sensors near each of the maximum temperature area and the minimum temperature area in consideration of individual differences among the single cells. The temperature sensor may be installed for each of all the single cells contained in the battery.

A measurement unit 30 includes a voltage sensor 32 and a current sensor 34. The measurement unit 30 measures a voltage V of the battery 10 when the battery 10 has no load or it is charged or discharged, and also measures a current I flowing into or out of the battery 10 when it is charged or discharged. The measured voltage V and current I are both transmitted to a calculation unit 100.

The calculation unit 100 includes a maximum/minimum temperature selection unit 102, an available power calculation unit 104, and a temperature protective unit 106. The maximum/minimum temperature selection unit 102 selects higher one of temperatures Tmax1 and Tmax2 detected by the temperature sensors $20x1$ and $20x2$ and outputs it as a maximum temperature Tmax. Also, the maximum/minimum temperature selection unit 102 selects lower one of temperatures Tmin1 and Tmin2 detected by the temperature sensors $20n1$ and $20n2$ and outputs it as a minimum temperature Tmin.

The available power calculation unit 104 calculates respective values of a maximum available charge power Pcmax1 (Pcmax(Tmax) and Pcmax(Tmin)) and a maximum available discharge power Pdmax1 (Pdmax(Tmax) and Pdmax(Tmin)) corresponding to the maximum temperature Tmax and the minimum temperature Tmin selected by the maximum/minimum temperature selection unit 102.

A manner of calculating the available charge power Pcmax1 and the available discharge power Pdmax1 by the available power calculation unit 104 will be described below with reference to FIGS. 2 through 4.

Figure 2:
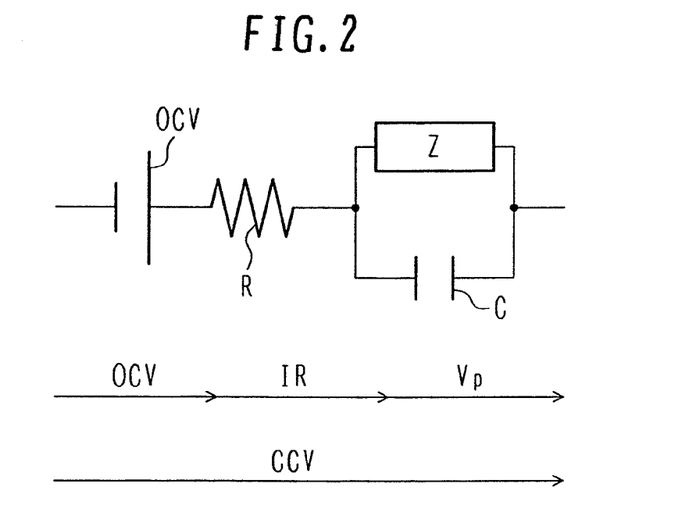
FIG. 2 is a circuit diagram showing an equivalent circuit of a battery.

FIG. 2 is a circuit diagram showing an equivalent circuit of the battery 10. FIGS. 3A and 3B are each a graph for explaining an equivalent impedance of the battery 10. FIG. 4 is a graph for explaining the relationship between the state of charge SOC and each of the maximum available discharge power and the maximum available charge power. FIG. 5 is a graph showing a limit characteristic of the temperature protective unit 106.

In FIG. 2, the battery 10 is illustrated by a serial connection of an open circuit voltage OCV, an internal DC resistance R, and a pair of an impedance Z and a capacitance component C which are connected in parallel.

When a current I is applied to the battery 10, a closed circuit voltage CCV of the battery 10 is expressed by the following formula (1):

$$CCV = OCV + IR + Vp \qquad (1)$$

In this formula, Vp represents a polarization voltage and corresponds to a voltage across the pair of the impedance Z and the capacitance component C which are connected in parallel.

The open circuit voltage OCV represents an open voltage when the battery 10 is neither charged nor discharged, and therefore it cannot be directly measured in a situation where the battery 10 is charged or discharged. For that reason, the open circuit voltage OCV is calculated by subtracting the IR drop and the polarization voltage Vp from the closed circuit voltage CCV, as expressed in the following formula (2):

$$OCV = CCV - IR - Vp \qquad (2)$$

The internal DC resistance R and the polarization voltage Vp represent characteristic information of the battery 10, which is stored in a storage unit installed internally or externally of the calculation unit 100. The characteristic information may be given as one value common to all the states, such as the temperature and the charge of state SOC of the battery 10, or a plurality of values depending on the states of the battery 10, such as the temperature and the charge of state SOC of the battery 10. By employing, as the characteristic information, a plurality of values depending on the states of the battery 10, the open circuit voltage OCV can be obtained with higher accuracy. The current value I is a current value measured by the measurement unit 30 when the battery 10 has no load or it is charged or discharged. Once the open circuit voltage OCV is calculated from the closed circuit voltage CCV, the IR drop and the polarization voltage Vp based on the formula (2), a maximum available charge current value Icmax and a maximum available discharge current value Idmax capable of being obtained from the battery 10 at that time can be calculated based on the following formulae (3) and (4):

$$Icmax = (Vupper - OCV)/Rz \qquad (3)$$

$$Idmax = (OCV - Vlower)/Rz \qquad (4)$$

In these formulae, Rz represents an equivalent impedance of the internal DC resistance R, the impedance Z and the capacitance component C shown in FIG. 2, Vupper represents an upper limit voltage of the battery 10, and Vlower represents a lower limit voltage of the battery 10.

Figure 3A:
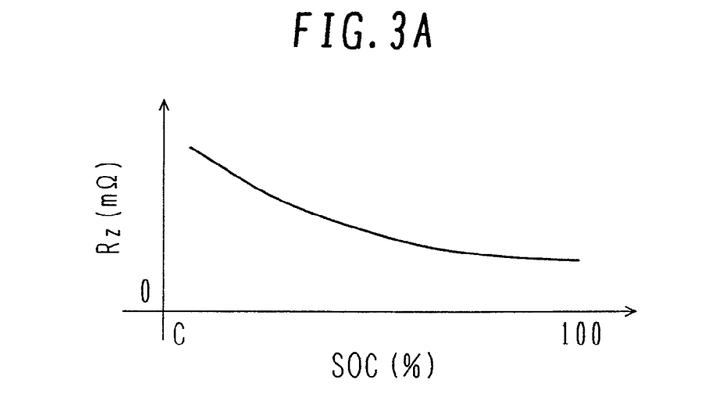
FIGS. 3A and 3B are each a graph for explaining an equivalent impedance of the battery.
Figure 3B:
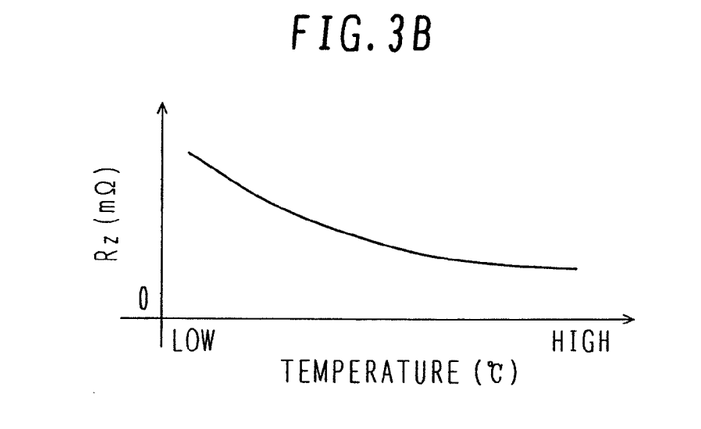

As shown in FIGS. 3A and 3B, the equivalent impedance Rz has different values depending on the temperature and the state of charge SOC of the battery 10. Accordingly, the maximum available current can be calculated with higher accuracy by setting the equivalent impedance Rz to different values depending on the temperature and the state of charge SOC of the battery 10 and selectively using those values. A maximum available charge power Pcmax and a maximum available discharge power Pdmax can be calculated by the following formulae (5) and (6):

$$Pcmax = Icmax \times Vupper \quad (5)$$

$$Pdmax = Idmax \times Vlower \quad (6)$$

Figure 4:
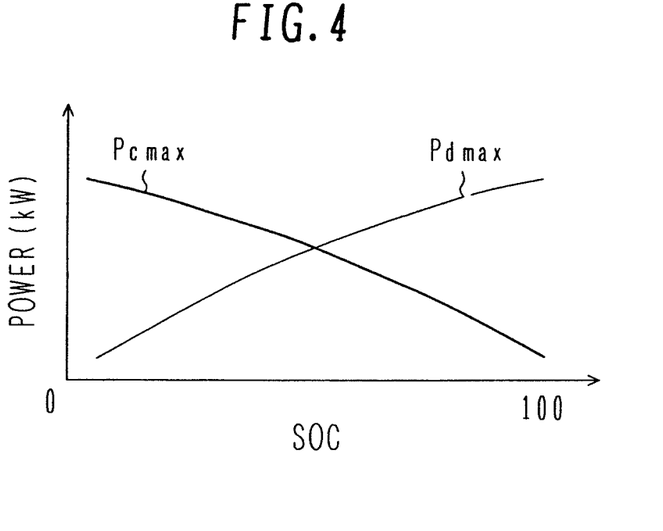
FIG. 4 is a graph for explaining the relationship between the state of charge SOC and each of the maximum available discharge power and the maximum available charge power.
Figure 5:
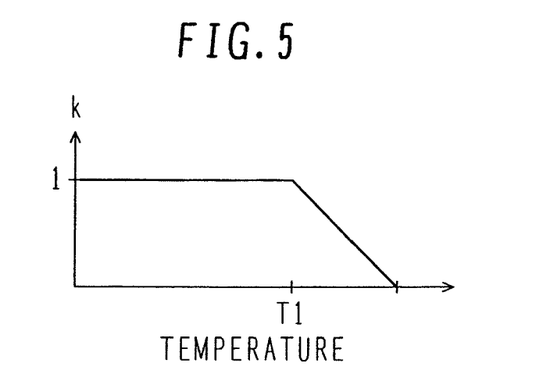
FIG. 5 is a graph showing a limit characteristic of a temperature protective unit used in the battery management system according to the first embodiment of the present invention.

As shown in FIG. 4, the calculated maximum available discharge power Pdmax is decreased at a lower value of the state of charge SOC and is increased at a higher value of the state of charge SOC. Also, the calculated maximum available charge power Pcmax is increased at a lower value of the state of charge SOC and is decreased at a higher value of the state of charge SOC. Further, at lower temperature, the maximum available power is decreased because the equivalent impedance Rz in the formulae (3) and (4) is increased. At higher temperature, the maximum available power is increased because the equivalent impedance Rz in the formulae (3) and (4) is decreased.

The available power calculation unit 104 calculates respective values of the maximum available charge power Pcmax (Tmax) and the maximum available discharge power Pdmax (Tmax) corresponding to the maximum temperature Tmax and respective values of the maximum available charge power Pcmax(Tmin) and the maximum available discharge power Pdmax(Tmin) corresponding to the minimum temperature Tmin.

The temperature protective unit 106 serves to limit the maximum available charge power and the maximum available discharge power when the temperature exceeds a predetermined temperature T1.

FIG. 5 shows the limit characteristic graph for the temperature protective unit 106. As shown in FIG. 5, when the temperature of the battery 10 exceeds the predetermined temperature T1, the temperature protective unit 106 sets a coefficient k, which is to be multiplied by the maximum available charge power and the maximum available discharge power, to a value smaller than 1 and outputs the multiplied results as a maximum available charge power Pcmax2 and a maximum available discharge power Pdmax2.

The selection unit 110 outputs the smallest one among plural values of the maximum available charge power and the smallest one among plural values of the maximum available discharge power, which have been calculated by the calculation unit 100. To describe the case where the coefficient k used in the temperature protective unit 106 is 1, for example, the selection unit 110 outputs, as the maximum available charge power Pcmax, a smaller value of the maximum available charge power Pcmax(Tmax) and the maximum available charge power Pcmax(Tmin), which have been calculated by the available power calculation unit 104, to a higher-level system. Also, the selection unit 110 outputs, as the maximum available discharge power Pdmax, a smaller value of the maximum available discharge power Pdmax(Tmax) and the maximum available discharge power Pdmax(Tmin), which have been calculated by the available power calculation unit 104, to the higher-level system.

Based on information of the maximum available charge power Pcmax supplied from the selection unit 110, the higher-level system employs the battery 10 such that the battery 10 is charged with electricity at a power level of not higher than the maximum available charge power Pcmax. Also, based on information of the maximum available discharge power Pdmax supplied from the selection unit 110, the higher-level system executes charge and discharge control of the battery 10 such that electricity accumulated in the battery 10 is discharged at a power level of not higher than the maximum available discharge power Pdmax.

The operation of the selection unit 110 will be described below with reference to FIG. 6.

Figure 6:
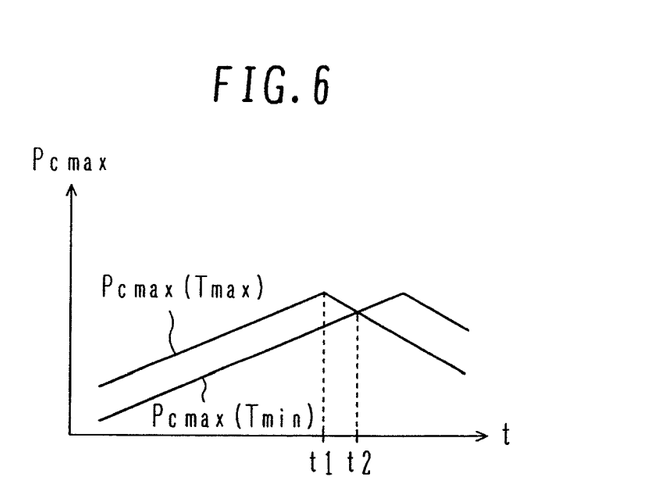
FIG. 6 is a graph for explaining the operation of a selection unit used in the battery management system according to the first embodiment of the present invention.

FIG. 6 is a graph for explaining the operation of the selection unit used in the battery management system according to the first embodiment of the present invention. Note that FIG. 6 shows only the maximum available charge power Pcmax.

When the battery 10 having been left to stand at room temperature is placed in environment under higher temperature, the temperature of the battery 10 gradually increases. Correspondingly, the maximum temperature Tmax and the minimum temperature Tmin also rise. As a result, the maximum available charge power Pcmax(Tmax) and the maximum available charge power Pcmax(Tmin) both calculated by the available power calculation unit 104 also gradually increase. However, when the maximum temperature Tmax exceeds the predetermined temperature T1 (shown in FIG. 5) at a time t1, for example, the temperature protective unit 106 restricts the maximum available charge power Pcmax(Tmax) so as to gradually reduce it. Then, at a time t2, the maximum available charge power Pcmax(Tmax) and the maximum available charge power Pcmax(Tmin) become equal to each other. Thereafter, the maximum available charge power Pcmax(Tmax) is smaller than the maximum available charge power Pcmax(Tmin).

In such a situation, the selection unit 110 selects the maximum available charge power Pcmax(Tmin) and outputs it to the higher-level system until the time t2. After the time t2, the selection unit 110 selects the maximum available charge power Pcmax(Tmax) and outputs it to the higher-level system.

The calculation unit 100 and the selection unit 110 are constituted by a controller, a computing system, or a microcomputer each of which is made up of a storage unit, a CPU and so on. However, the calculation unit 100 and the selection unit 110 can be constituted any type of means which can receive information, execute calculation based on the received information, and output the calculated result. The measurement unit 30, the calculation unit 100, and the selection unit 110 may be realized as a microcomputer constituted on the same device. Further, the measurement unit 30, the calculation unit 100, and the selection unit 110 may be installed inside the battery 10 in a combined manner.

As another example, the calculation unit 100 may output the maximum available charge current Icmax and the maximum available discharge current Idmax which are expressed by the above-mentioned formulae (3) and (4), and the selection unit 110 may select smaller one of values of the maximum available current (each of the maximum available charge current Icmax and the maximum available discharge current Idmax) corresponding to the minimum temperature and the maximum temperature, which have been calculated by the calculation unit 100, followed by outputting the selected smaller value to the higher-level system.

As still another example, the higher-level system may execute the function of the selection unit 110. In this example, the calculation unit 100 outputs, to the higher-level system, respective values of the maximum available power or the maximum available current corresponding to the minimum temperature and the maximum temperature, and the higher-level system selects smaller one of the received values of the maximum available power or the maximum available current corresponding to the minimum temperature and the maximum temperature, thereby performing the charge and discharge control of the battery 10 based on the selected value.

According to this first embodiment of the present invention, as described above, since the calculation unit 100 calculates respective values of the maximum available power or the maximum available current corresponding to the minimum temperature and the maximum temperature and the selection unit 110 selects smaller one of the calculated values, the charge and discharge control of the combined battery can be performed in a way adaptable for a single cell of which the maximum available power or the maximum available current is smallest. As a result, optimum charge and discharge control can be realized in consideration of a temperature variation in the combined battery made up of a plurality of single cells optionally combined with each other.

The construction and operation of a battery management system according to a second embodiment of the present invention will be described below with reference to FIGS. 7 and 8.

Figure 7:
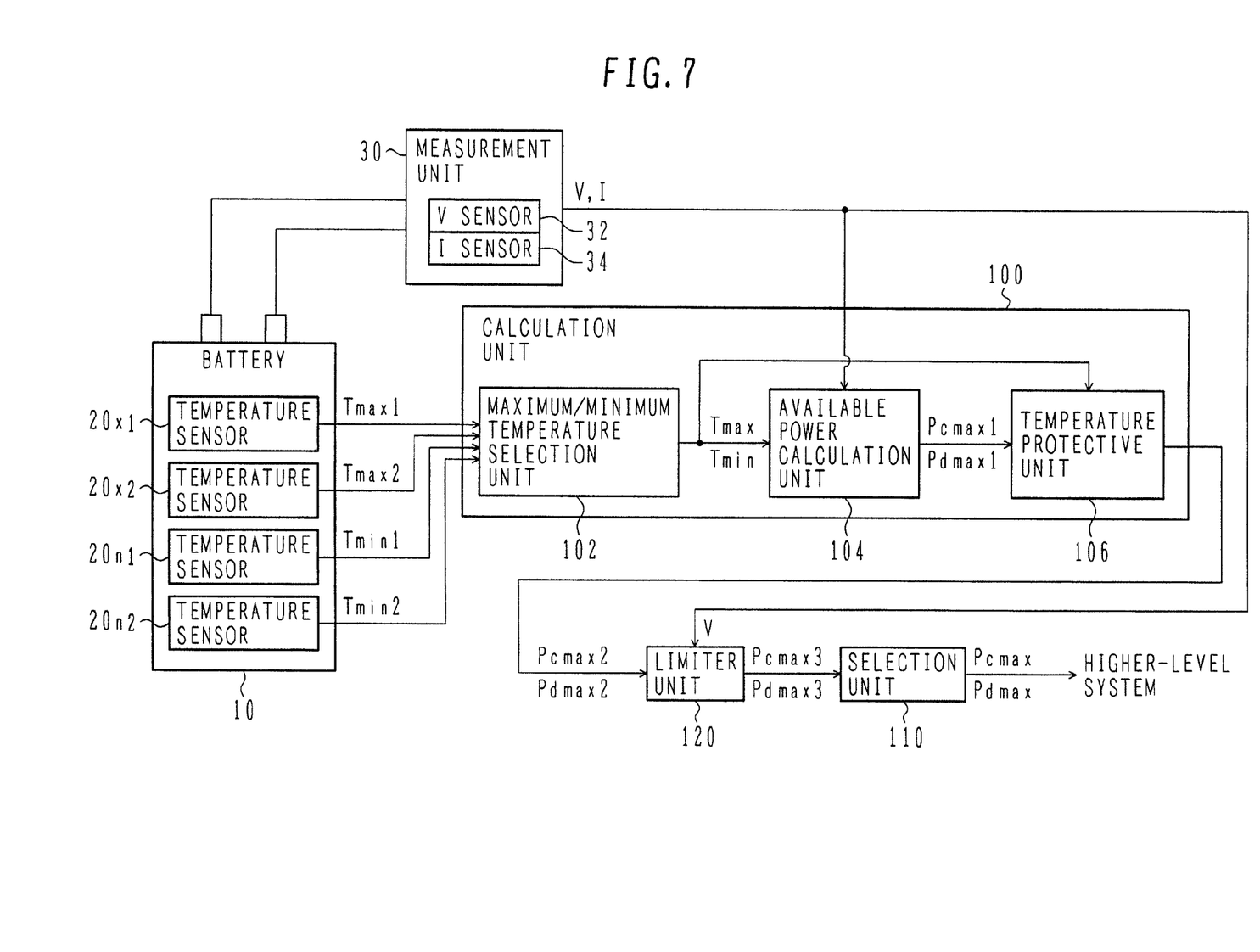
FIG. 7 is a block diagram showing the system configuration of a battery management system according to a second embodiment of the present invention.

FIG. 7 is a block diagram showing the system configuration of the battery management system according to the second embodiment of the present invention. FIGS. 8A and 8B are each a graph for explaining the operation of a limiter unit used in the battery management system according to the second embodiment of the present invention. Note that, in FIG. 7, the same characters as those in FIG. 1 denote the same components.

In this second embodiment, a limiter unit 120 is disposed between the calculation unit 100 and the selection unit 110 in addition to the construction of the first embodiment shown in FIG. 1.

The calculation unit 100 outputs the maximum available charge power Pcmax2 corresponding to the maximum temperature and the minimum temperature (i.e., the maximum available charge power Pcmax(Tmax) corresponding to the maximum temperature Tmax and the maximum available charge power Pcmax(Tmin) corresponding to the minimum temperature Tmin) and also outputs the maximum available discharge power Pdmax2 corresponding to the maximum temperature and the minimum temperature (i.e., the maximum available discharge power Pdmax(Tmax) corresponding to the maximum temperature Tmax and the maximum available discharge power Pdmax(Tmin) corresponding to the minimum temperature Tmin).

The limiter unit 120 receives not only the maximum available power (i.e., the maximum available charge power Pcmax2 and the maximum available discharge power Pdmax2) of the battery 10, which have been calculated by the calculation unit 100, but also the battery voltage V of the battery 10, which has been measured by the measurement unit 30. The limiter unit 120 limits the maximum available charge power to be reduced when the battery voltage V is near an upper limit voltage, and it limits the maximum available discharge power to be reduced when the battery voltage V is near a lower limit voltage.

Figure 8A:
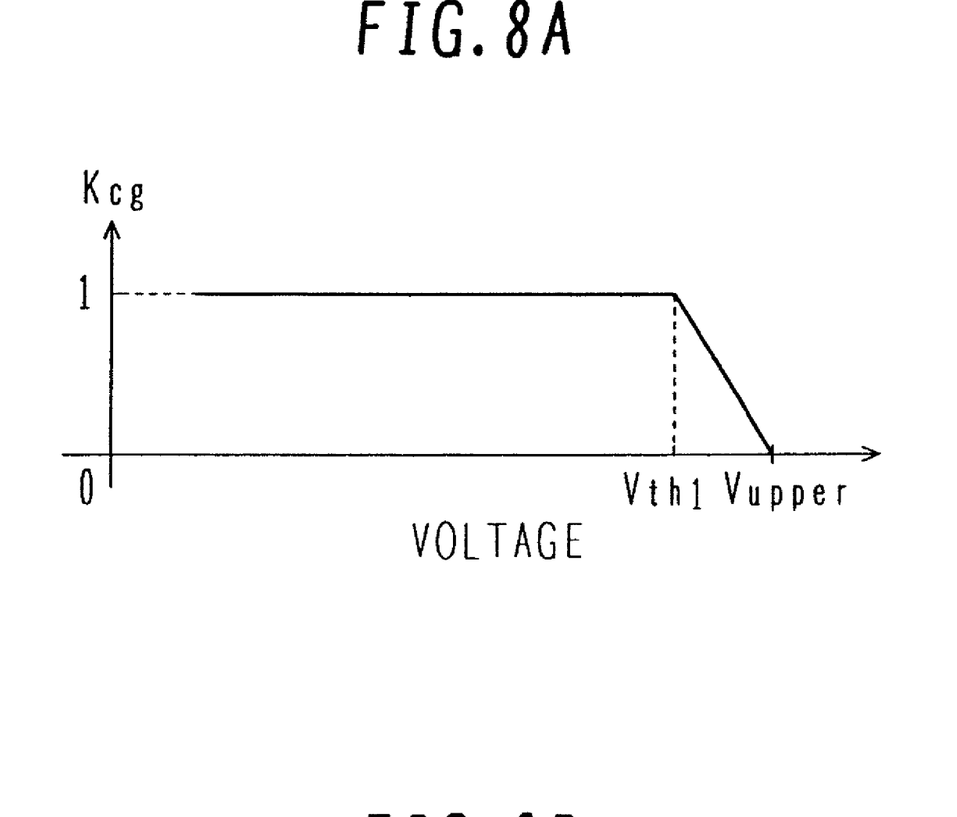
FIGS. 8A and 8B are each a graph for explaining the operation of a limiter unit used in the battery management system according to the second embodiment of the present invention.
Figure 8B:
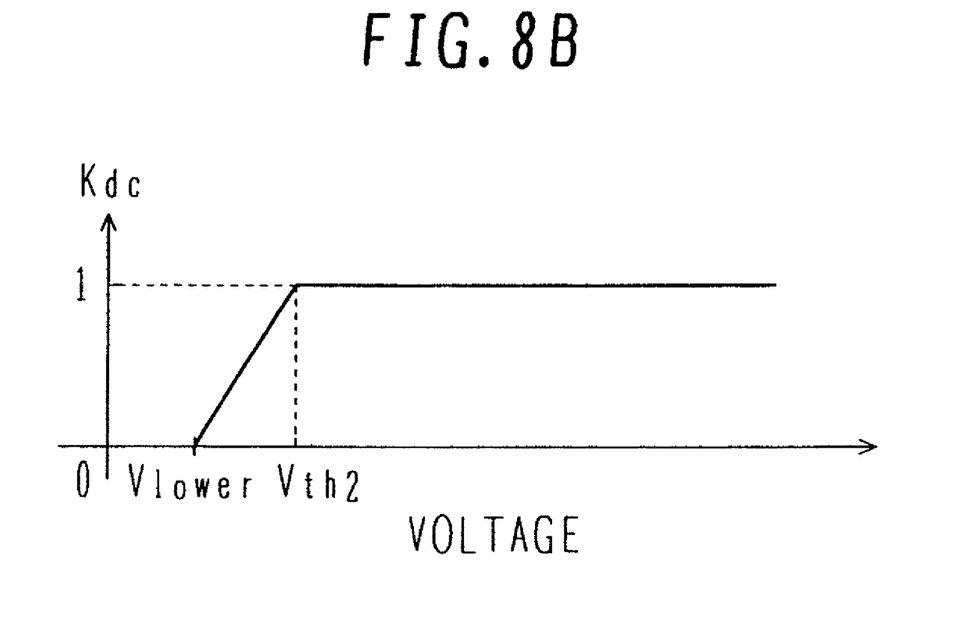

More specifically, as shown in FIG. 8A, the limiter unit 120 has a charge coefficient Kcg which takes a value of not larger than 1 when the battery voltage V is increased beyond a first threshold voltage Vth1, and which becomes 0 when the battery voltage reaches an upper limit voltage Vupper. Also, as shown in FIG. 8B, the limiter unit 120 has a discharge coefficient Kdc which takes a value of not larger than 1 when the battery voltage V is decreased beyond a second threshold voltage Vth2, and which becomes 0 when the battery voltage reaches a lower limit voltage Vlower. The limiter unit 120 calculates maximum available power Pcmax3 using the charge coefficient Kcg and the discharge coefficient Kdc based on the following formulae (7) and (8):

$$Pcmax3 = Kcg \times Pcmax2 \quad (7)$$

$$Pdmax3 = Kdc \times Pdmax2 \quad (8)$$

Further, the selection unit 110 outputs, as the maximum available power Pcmax, a smaller value of the maximum available charge power Pcmax3(Tmax) and the maximum available charge power Pcmax3(Tmin), which are outputted from the limiter unit 120, to the higher-level system. Also, the selection unit 110 outputs, as the maximum available discharge power Pdmax, a smaller value of the maximum available discharge power Pdmax3(Tmax) and the maximum available discharge power Pdmax3(Tmin), which are outputted from the limiter unit 120, to the higher-level system.

With the processing executed by the limiter unit 120, when the battery voltage V is near the upper limit voltage or the lower limit voltage, the maximum available power is limited to a smaller value and transmitted to the higher-level system such that the battery 10 is employed in accordance with the limited maximum available power. The processing executed by the limiter unit 120 can also be likewise applied to the maximum available current calculated by the calculation unit 100.

The function of the limiter unit 120 may be realized by executing the above-described processing by using, e.g., a controller, a computing system, or a microcomputer each of which is independent of the calculation unit 100 and made up of a storage unit, a CPU and so on. Alternatively, the function of the limiter unit 120 may be realized as a part of the calculation executed by the calculation unit 100.

According to this second embodiment, the calculation unit 100 and the selection unit 110 enable the charge and discharge control to be performed in an optimum manner in consideration of a temperature variation in the combined battery made up of a plurality of single cells optionally combined with each other.

Furthermore, the limiter unit 120 enables the charge and discharge control to be performed while preventing overcharge and overdischarge of the battery 10.

The construction and operation of a battery management system according to a third embodiment of the present invention will be described below with reference to FIG. 9.

Figure 9:
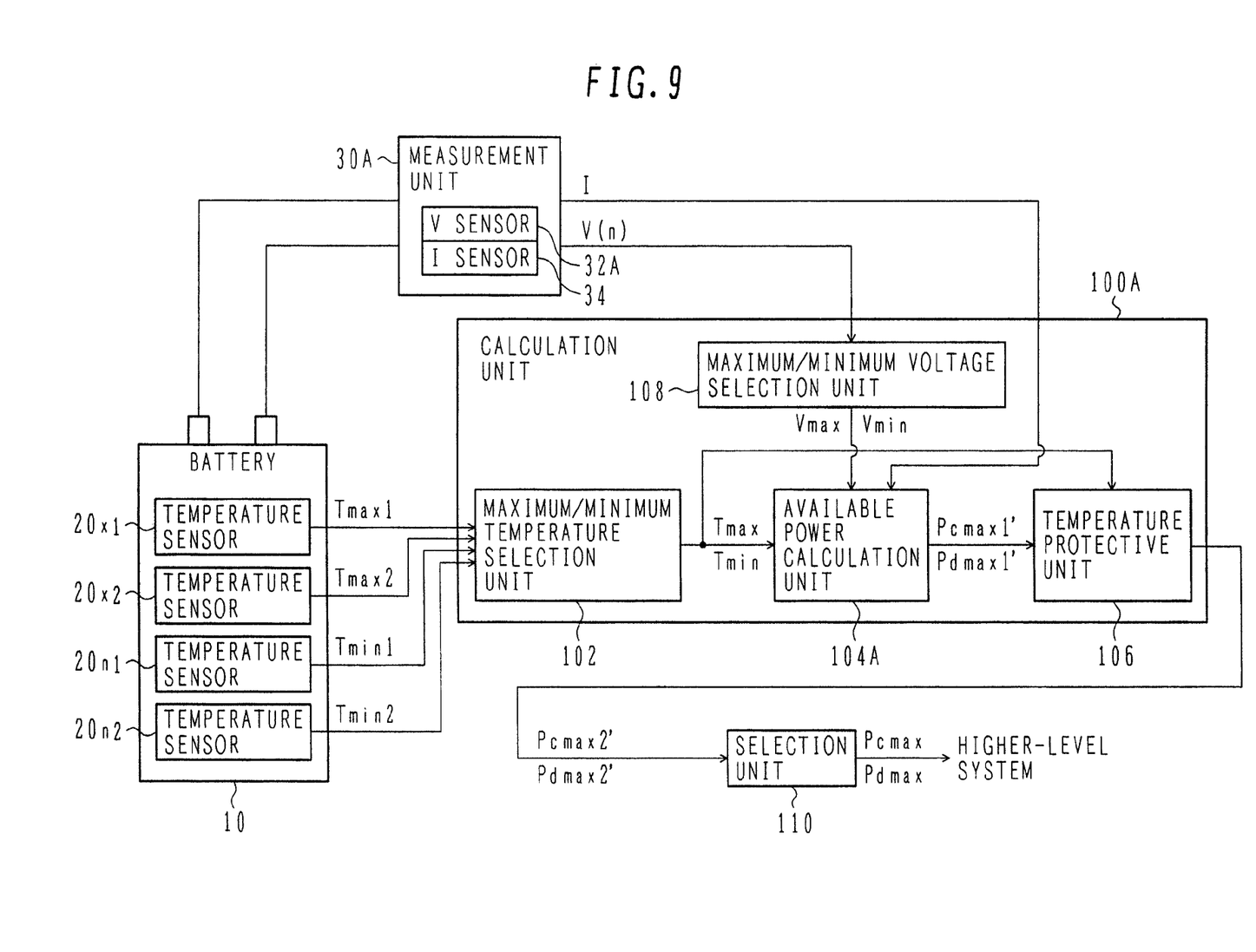
FIG. 9 is a block diagram showing the system configuration of a battery management system according to a third embodiment of the present invention.

FIG. 9 is a block diagram showing the system configuration of the battery management system according to the third embodiment of the present invention. Note that, in FIG. 9, the same characters as those in FIG. 1 denote the same components.

Generally, in the combined battery made up of a plurality of single cells optionally combined with each other, a variation in the state of charge (SOC) occurs among the individual single cells. The battery having high SOC has a smaller maximum available charge power and a larger maximum available discharge power. On the other hand, the battery having low SOC has a larger maximum available charge power and a smaller maximum available discharge power. Accordingly, when the charge and discharge management of the combined battery is performed, this second embodiment executes the charge and discharge control in consideration of the SOC variation.

A measurement unit 30A includes a voltage sensor 32A and a current sensor 34. The voltage sensor 32A of the measurement unit 30A measures a voltage v(n) of each of single cells constituting the battery 10 when the single cell has no load or it is charged or discharged. When the battery 10 is made up of 96 single cells connected in series, the voltage v(n) is outputted in number 96. Instead of outputting the voltage of each single cell, a voltage may be outputted per two or more single cells. Further, when an overall battery unit is constituted by connecting a plurality of batteries 10 in series, each of which includes a plurality of single cells, a voltage of each battery 10 may be measured. The current sensor 34 outputs a current I flowing into or out of the battery 10.

A calculation unit 100A includes an available power calculation unit 104A and a maximum/minimum voltage selection unit 108 in addition to the maximum/minimum temperature selection unit 102 and the temperature protective unit 106. The maximum/minimum voltage selection unit 108 selects a maximum voltage vmax and a minimum voltage vmin from among the voltages v(n) outputted from the measurement unit 30A, and outputs the selected voltages to the available power calculation unit 104A.

The available power calculation unit 104A calculates a maximum voltage Vmax in the entirety of the battery based on the maximum voltage vmax. More specifically, the maximum voltage Vmax in the entirety of the battery is calculated by multiplying the maximum voltage vmax in units of the single cell by the number (e.g., 96) of the single cells contained in the battery. Also, the available power calculation unit 104A calculates a minimum voltage Vmin in the entirety of the battery based on the minimum voltage vmin.

By assigning each of the minimum voltage Vmin and the maximum voltage Vmax to the closed circuit voltage CCV in the formula (1), the calculation unit 100A calculates respective values of a maximum available charge power Pcmax (Vmin) and a maximum available discharge power Pdmax (Vmin) corresponding to the minimum voltage Vmin and respective values of a maximum available charge power Pcmax(Vmax) and a maximum available discharge power Pdmax(Vmax) corresponding to the maximum voltage Vmax based on the formulae (2) through (6). In other words, the calculation unit 100A outputs a maximum available charge power Pcmax1' (Pcmax(Vmin) and Pcmax(Vmax)) and a maximum available discharge power Pdmax1' (Pdmax (Vmin) and Pdmax(Vmax)) to the temperature protective unit 106. Herein, the maximum available discharge power Pdmax (Vmin) and the maximum available charge power Pcmax (Vmin) calculated corresponding to the minimum voltage Vmin are relatively small and large, respectively. Also, the maximum available discharge power Pdmax(Vmax) and the maximum available charge power Pcmax(Vmax) calculated corresponding to the maximum voltage Vmax are relatively large and small, respectively.

When the temperature of the battery 10 is higher than a predetermined temperature, the temperature protective unit 106 restricts the maximum available charge power Pcmax1' and the maximum available discharge power Pdmax1' and output them as a maximum available charge power Pcmax2' and a maximum available discharge power Pdmax2', respectively, to the selection unit 110.

The selection unit 110 selects, as the maximum available charge power and the maximum available discharge power, smaller one of the inputted values of the maximum available charge power Pcmax2' (Pcmax(Vmin) and Pcmax(Vmax)) and smaller one of the inputted values of the maximum available discharge power Pdmax2' (Pdmax(Vmin) and Pdmax (Vmax)), followed by transmitting the selected values to the higher-level system. The higher-level system employs the battery 10 in accordance with the received maximum available power. The processing executed by the selection unit 110 can also be likewise applied to the maximum available current calculated by the calculation unit 100.

According to this third embodiment, since the charge and discharge control of the battery 10 is performed depending on the state of charge SOC of the single cell, it is possible to perform the charge and discharge control in consideration of an SOC variation among the plurality of single cells contained in the battery 10.

The construction and operation of a battery management system according to a fourth embodiment of the present invention will be described below with reference to FIG. 10.

Figure 10:
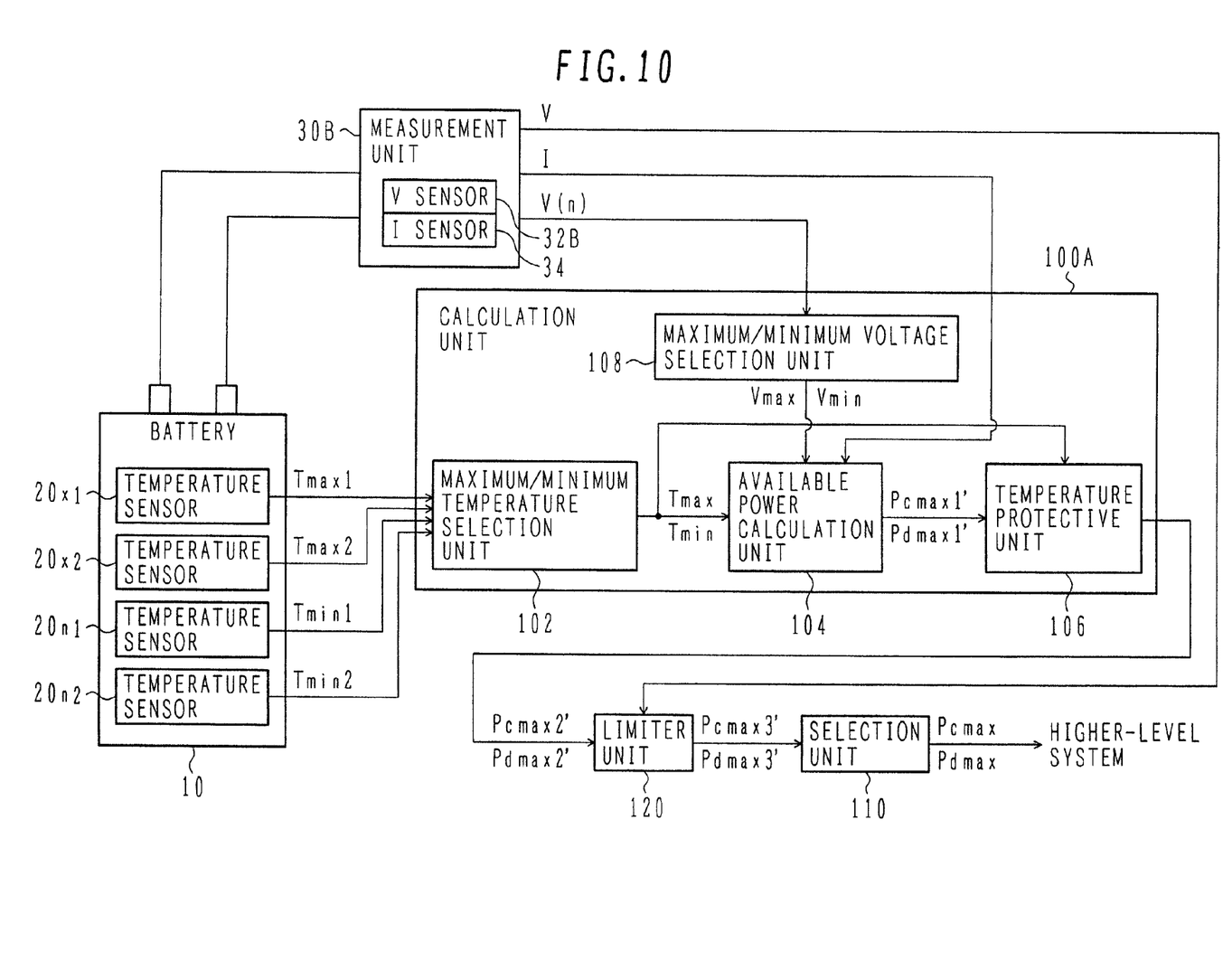
FIG. 10 is a block diagram showing the system configuration of a battery management system according to a fourth embodiment of the present invention.

FIG. 10 is a block diagram showing the system configuration of the battery management system according to the fourth embodiment of the present invention. Note that, in FIG. 10, the same characters as those in FIG. 9 denote the same components.

The battery management system according to this fourth embodiment includes the limiter unit 120, described above with reference to FIG. 8, in addition to the system configuration shown in FIG. 9. The operations of the other components than the limiter unit 120 are the same as those described above with reference to FIG. 9, and the operation of the limiter unit 120 is the same as that described above with reference to FIG. 8.

A measurement unit 30B has the functions of both the measurement unit 30 shown in FIG. 1 and the measurement unit 30A shown in FIG. 9. Accordingly, the measurement unit 30B outputs a voltage V in the entirety of the battery 10 when the battery 10 has no load or it is charged or discharged, and also outputs a current I flowing into or out of the battery 10 when it is charged or discharged. Further, the measurement unit 30B detects a voltage of each of single cells constituting the battery 10 and outputs a voltage v(n) per single cell in the battery 10 when the single cell has no load or it is charged or discharged.

Thus, according to this fourth embodiment, since the charge and discharge control of the battery 10 is performed depending on the state of charge SOC of the single cell, it is possible to perform the charge and discharge control in consideration of an SOC variation among the plurality of single cells contained in the battery 10.

Furthermore, the limiter unit 120 enables the charge and discharge control to be performed while preventing overcharge and overdischarge of the battery 10. The maximum voltage Vmax and the minimum voltage Vmin, which are used in the calculation of the limiter unit 120 to respectively limit the maximum available charge and the maximum available discharge power, may be the voltages measured from the entirety of the battery 10 or from the individual single cells when the battery 10 or the single cell has no load or it is charged or discharged. By limiting the maximum available charge power and the maximum available discharge power in accordance with the maximum voltage and the minimum voltage, respectively, overcharge and overdischarge can be prevented with higher reliability.

The construction and operation of a battery management system according to a fifth embodiment of the present invention will be described below with reference to FIG. 11.

Figure 11:
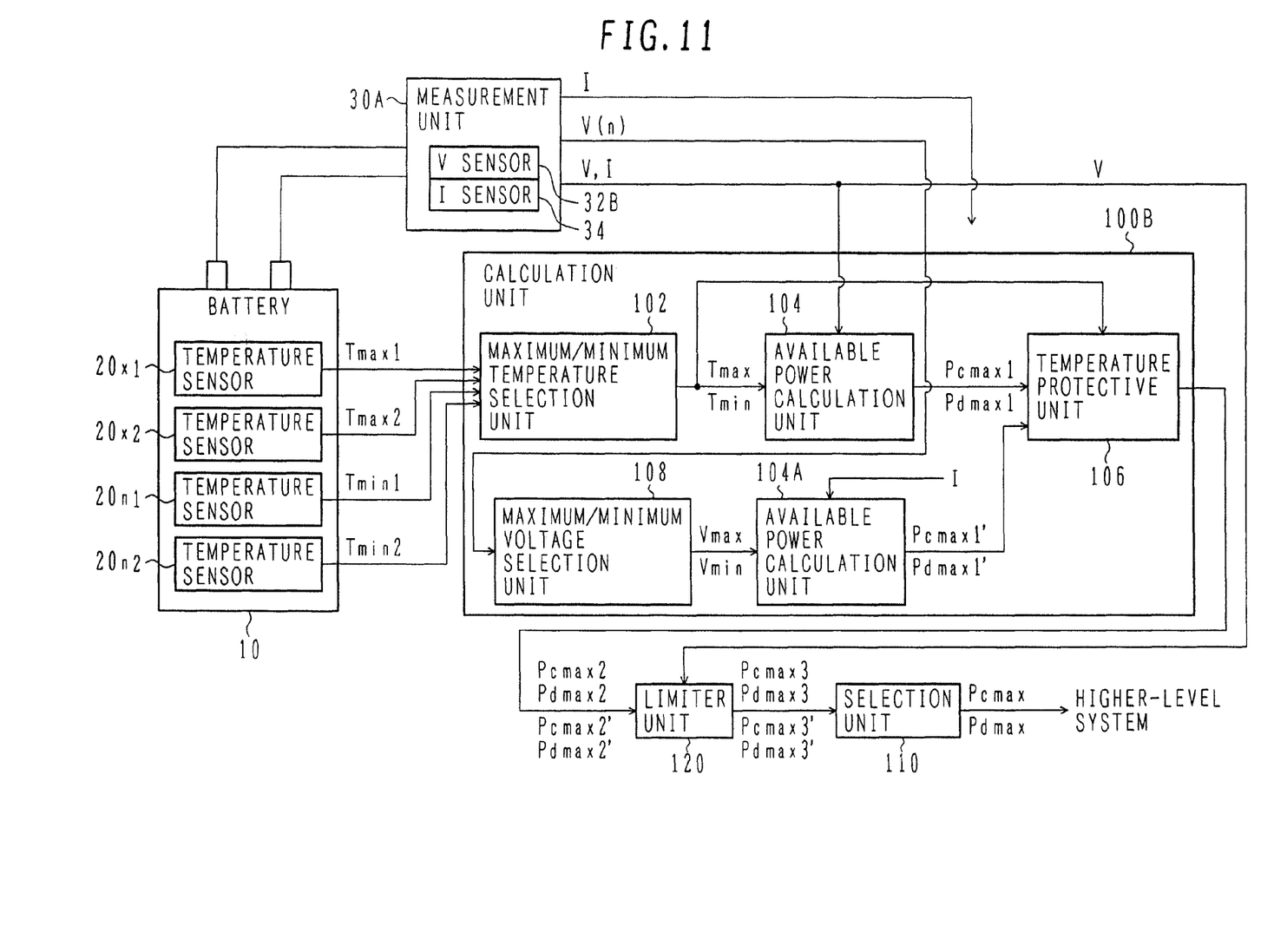
FIG. 11 is a block diagram showing the system configuration of a battery management system according to a fifth embodiment of the present invention.

FIG. 11 is a block diagram showing the system configuration of the battery management system according to the fifth embodiment of the present invention. Note that, in FIG. 11, the same characters as those in FIGS. 7 and 10 denote the same components.

The battery management system according to this fifth embodiment includes both the system configuration shown in FIG. 7 and the system configuration shown in FIG. 10.

A calculation unit 100B includes the maximum/minimum temperature selection unit 102, the available power calculation unit 104, the temperature protective unit 106, the available power calculation unit 104A, and the maximum/minimum voltage selection unit 108. The calculation unit 100B calculates and outputs respective values of the maximum available charge power Pcmax2 (Pcmax(Tmax) and Pcmax (Tmin)) corresponding to the maximum temperature Tmax and the minimum temperature Tmin, respective values of the maximum available discharge power Pdmax2 (Pdmax (Tmax) and Pdmax(Tmin)) corresponding to the maximum temperature Tmax and the minimum temperature Tmin, respective values of the maximum available charge power Pcmax2' (Pcmax(Vmax) and Pcmax(Vmin)) corresponding to the maximum voltage Vmax and the minimum voltage Vmin, and respective values of the maximum available discharge power Pdmax2' (Pdmax(Vmax) and Pdmax(Vmin)) corresponding to the maximum voltage Vmax and the minimum voltage Vmin.

According to this fifth embodiment, the calculation unit 100B and the selection unit 110 enable the charge and discharge control to be performed in an optimum manner in consideration of a temperature variation in the combined battery made up of a plurality of single cells optionally combined with each other.

Also, since the charge and discharge control of the battery 10 is performed with the aid of the calculation unit 100B depending on the state of charge SOC of the single cell, it is possible to perform the charge and discharge control in consideration of an SOC variation among the plurality of single cells contained in the battery 10.

Furthermore, the limiter unit 120 enables the charge and discharge control to be performed while preventing overcharge and overdischarge of the battery 10.

As described above, the embodiments of the present invention are intended for application to a power supply system including the combined battery made up of a plurality of single cells optionally combined with each other, and they can be utilized in a wide variety of fields without being restricted to vehicles such as hybrid and electric vehicles.

In addition, according to the present invention, since the maximum available power is obtained in consideration of the temperature variation and/or the battery voltage and is used in the charge and discharge control, the combined battery made up of a plurality of single cells can be safely and optimally managed in an overall supervising manner.

What is claimed is:

1. A battery management system comprising:
voltage and current measuring means for measuring a voltage and a current of said battery;
calculation means for calculating respective values of maximum available charge and discharge powers or maximum available charge and discharge currents of said battery based on the voltage and the current of said battery measured by said voltage and current measuring means; and
limiter means for limiting the values of the maximum available charge or discharge powers or the maximum available charge or discharge currents, which are calculated by said calculation means, to be reduced when the voltage of said battery measured by said voltage and current measuring means is near an upper limit voltage or a lower limit voltage.

2. The battery management system according to claim 1, wherein said limiter means provides a charge coefficient which takes a value of not larger than 1 when the battery voltage is increased beyond a first threshold voltage which is smaller than the upper limit voltage, and which becomes 0 when the battery voltage reaches the upper limit voltage;
said limiter means provides a discharge coefficient which takes a value of not larger than 1 when the battery voltage is decreased beyond a second threshold voltage which is larger than the lower limit voltage, and which becomes 0 when the battery voltage reaches the lower limit voltage; and
said limiter means multiplies the charge coefficient or the discharge coefficient by the maximum available charge or discharge powers or the maximum available charge or discharge currents, and limits it to be small, when the voltage of said battery measured by said voltage and current measuring means is larger than the first threshold voltage or is smaller than the second threshold voltage.

3. A battery management system comprising:
voltage and current measuring means for measuring a voltage and a current of said battery;
calculation means for calculating respective values of maximum available charge and discharge powers or maximum available charge and discharge currents of said battery based on the voltage and the current of said battery measured by said voltage and current measuring means; and
limiter means for limiting the values of the maximum available charge or discharge powers or the maximum available charge or discharge currents, which are calculated by said calculation means, which limits the values when the voltage of said battery measured by said voltage and current measuring means is near an upper limit voltage or a lower limit voltage.

4. The battery management system according to claim 3, wherein said limiter means starts to limit available charge power or available charge current when the voltage of said battery measured by said voltage and current measuring means is increased beyond a first threshold voltage which is smaller than the upper limit voltage, or to limit available discharge power or available discharge current when the voltage of said battery measured by said voltage and current measuring means is decreased beyond a second threshold voltage which is larger than the lower limit voltage, and which becomes 0 when the battery voltage reaches the lower limit voltage; and
said limiter means multiplies the charge coefficient or the discharge coefficient by the maximum available charge or discharge powers or the maximum available charge or discharge currents, and limits it to be small, when the voltage of said battery measured by said voltage and current measuring means is larger than the first threshold voltage or is smaller than the second threshold voltage.

5. The battery management system according to claim 3, wherein said limiter means provides a charge coefficient which takes a value of not larger than 1 when the battery voltage is increased beyond a first threshold voltage which is smaller than the upper limit voltage, and which becomes 0 when the battery voltage reaches the upper limit voltage;
said limiter means provides a discharge coefficient which takes a value of not larger than 1 when the battery voltage is decreased beyond a second threshold voltage which is larger than the lower limit voltage, and which becomes 0 when the battery voltage reaches the lower limit voltage; and
said limiter means multiplies the charge coefficient or the discharge coefficient by the maximum available charge or discharge powers or the maximum available charge or discharge currents, and limits it to be small, when the voltage of said battery measured by said voltage and current measuring means is larger than the first threshold voltage or is smaller than the second threshold voltage.

* * * * *